(12) United States Patent
Yu et al.

(10) Patent No.: US 10,565,089 B2
(45) Date of Patent: Feb. 18, 2020

(54) IDENTIFICATION OF CODE FEATURES POTENTIALLY ASSOCIATED WITH CODE BEHAVIOR

(71) Applicant: SAP SE, Walldorf (DE)

(72) Inventors: Xia Yu, Shanghai (CN); Yang Peng, Shanghai (CN); Xikang Wu, Shanghai (CN); Jieyan Huang, Shanghai (CN)

(73) Assignee: SAP SE, Walldorf (DE)

(*) Notice: Subject to any disclaimer, the term of this patent is extended or adjusted under 35 U.S.C. 154(b) by 273 days.

(21) Appl. No.: 15/237,065

(22) Filed: Aug. 15, 2016

(65) Prior Publication Data
US 2018/0046562 A1 Feb. 15, 2018

(51) Int. Cl.
*G06F 11/36* (2006.01)

(52) U.S. Cl.
CPC ........ *G06F 11/362* (2013.01); *G06F 11/3612* (2013.01)

(58) Field of Classification Search
CPC .............. G06F 11/0766; G06F 11/366; G06F 11/3664; G06F 11/362
See application file for complete search history.

(56) References Cited

U.S. PATENT DOCUMENTS

| | | | | |
|---|---|---|---|---|
| 7,386,839 B1* | 6/2008 | Golender | .............. | G06F 11/366 717/131 |
| 2007/0033659 A1* | 2/2007 | Hoche | ...................... | G06F 8/443 726/28 |
| 2008/0189687 A1* | 8/2008 | Levine | ................ | G06F 11/3636 717/128 |
| 2009/0077017 A1* | 3/2009 | Belknap | ................ | G06F 16/217 |
| 2011/0078674 A1* | 3/2011 | Ershov | ...................... | G06F 8/75 717/170 |
| 2013/0097585 A1* | 4/2013 | Jentsch | ...................... | G06F 8/71 717/122 |
| 2014/0310688 A1* | 10/2014 | Granshaw | ............. | G06F 11/366 717/123 |
| 2015/0082268 A1* | 3/2015 | Craig | ........................ | G06F 8/71 717/101 |
| 2016/0092210 A1* | 3/2016 | Kuchibhotla | ............. | G06F 8/71 717/121 |
| 2016/0132686 A1 | 5/2016 | Peng | | |
| 2016/0179487 A1 | 6/2016 | Peng et al. | | |
| 2016/0179570 A1 | 6/2016 | Peng et al. | | |
| 2016/0246703 A1* | 8/2016 | Bank | .................... | G06F 11/3664 |

* cited by examiner

*Primary Examiner* — Wei Y Zhen
*Assistant Examiner* — Brahim Bourzik
(74) *Attorney, Agent, or Firm* — Klarquist Sparkman, LLP

(57) ABSTRACT

A first code version is received. The first code version includes a plurality of code features, such as methods or classes. A second code version is received. The second code version includes a plurality of code features. The first code version is executed. A first plurality of code features executed during the execution of the first code version are determined. A second plurality of code features differing between the first and second code versions are determined. The first and second plurality of code features are compared. An indication is provided that a code feature is potentially relevant to the code behavior if the code feature is present in the first plurality of code features and in the second plurality of code features.

15 Claims, 12 Drawing Sheets

IDENTIFICATION OF CODE FEATURES POTENTIALLY ASSOCIATED WITH CODE BEHAVIOR

FIELD

The present disclosure generally relates to identifying the source of a code behavior. Particular implementations relate to determining code features likely to be associated with code behavior of interest by identifying code features that were executed in association with the behavior and which are identified as having changed compared with another code version.

BACKGROUND

Determining and correcting the source of software errors or performance issues, commonly referred to as debugging, remains a major problem in software development. Several studies have estimated that debugging consumes over fifty percent of software development time and costs. Although software configuration management systems and formalized debugging approaches can assist in debugging efforts, debugging can remain a tedious, time consuming task.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for facilitating the identification of the source of a code behavior of interest, such as code features that may give rise to the behavior. For example, the behavior may result from a defect in code associated with the code feature. A code behavior of interest, in some implementations, can be a runtime error. According to a particular method, a first code version is received. The first code version includes a plurality of code features, such as methods or classes. A second code version is received. The second code version includes a plurality of code features.

The first code version is executed. A first plurality of code features executed during the execution of the first code version are determined. A second plurality of code features differing between the first and second code versions are determined. The first and second plurality of code features are compared. An indication is provided that a code feature is potentially relevant to the code behavior if the code feature is present in the first plurality of code features and in the second plurality of code features.

The present disclosure also includes computing systems and tangible, non-transitory computer readable storage media configured to carry out, or including instructions for carrying out, an above-described method. As described herein, a variety of other features and advantages can be incorporated into the technologies as desired.

DETAILED DESCRIPTION

Example 1—Overview

Figure 1:
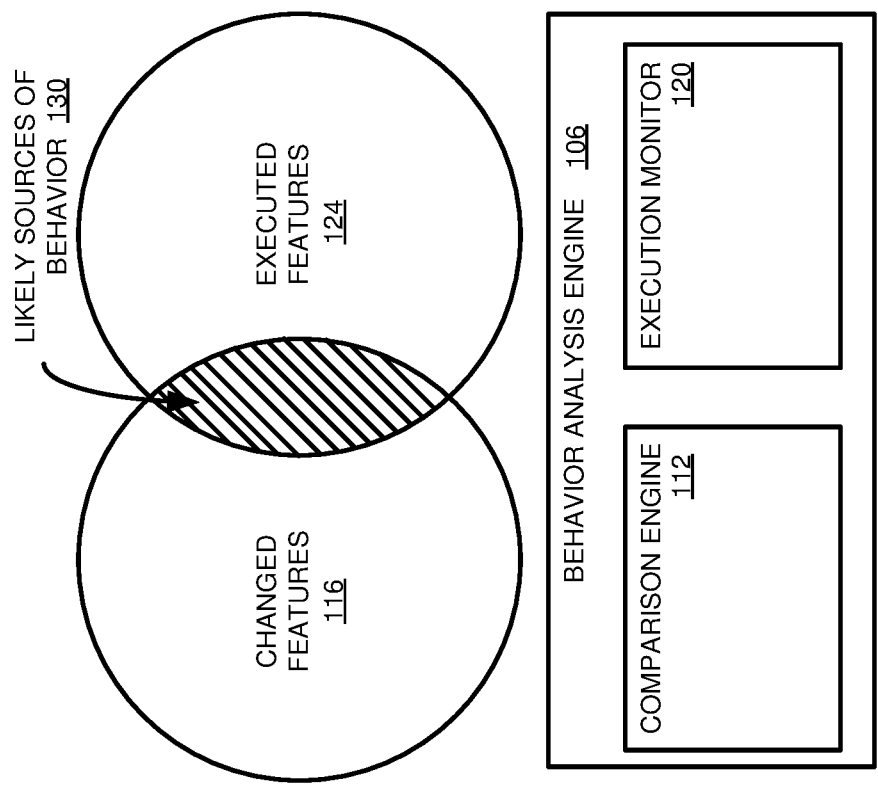
FIG. 1 is a schematic diagram illustrating how a behavior analysis engine can be used to identify code features likely to be associated with a particular code behavior according to an embodiment of the present disclosure.

Software is ubiquitous in today's society. Software is being incorporated into an increasing number of devices, developed and improved for an ever increasing number of applications, and is growing ever more complex. Determining and correcting the source of software errors or performance issues, commonly referred to as debugging, remains a major problem in software development. Several studies have estimated that debugging consumes over fifty percent of software development time and costs.

There have been a number of approaches to try and reduce the amount of time spent debugging code, particularly in the coding of large, complex projects which may involve many different developers or programmers, or when the code is updated following its release. For example, software configuration management (SCM) is an approach that has been used to manage and control changes to code. SCM systems typically implement version control.

Version or revision control can be used to document changes to code over time. If an error in the code is discovered, earlier versions of code can be retrieved to determine whether the error is also present when the earlier code is executed, or to investigate changes which may have resulted in the error. In some cases, multiple developers or programmers may be simultaneously working on the same or overlapping code segments. Version control can be used to help merge code changes, and to identify the sources of errors in the merged code by looking at the constituent code branches.

SCM systems can also be used to provide baseline code versions. A baseline code version can be a particular state of the code. For example, a baseline code version may be a version known to be stable or have particular functionality. Baseline code versions can serve as reference points to identify errors in updated code.

In some cases, a developer or programmer may only be assigned or authorized to work on a particular portion of a project. SCM systems can be used to restrict access of developers or programmers to particular, assigned code segments, which can help prevent corruption of a working codebase, and limit conflicting changes.

One software debugging technique, which can be used in conjunction with a SCM system, is regression testing. Regression testing can involve seeking to identify the source of errors in code which previously performed correctly. Regression testing can include testing changed code by running tests which are known to have uncovered errors in prior versions of the code.

Although SCM systems and formalized debugging approaches can assist in debugging efforts, debugging can remain a tedious, time consuming task. For example, if a bug is identified, such as using regression testing, the code version with the error can be compared with earlier code versions, including a baseline version. However, if there are a number of prior revisions, it may be necessary to compare the error-containing code to several earlier code versions. In addition, if one or more revisions includes changes to multiple code elements, comparing even one earlier code version with the erroneous code can require the review of a significant amount of code.

The present disclosure can provide for automated analysis of changes between a first code version, such as modified code in which an error, defect, or performance issue has been identified, and one or more second code versions, including a baseline code version. The analysis can include analyzing code features, such as classes and methods, which have changed between the first and second code versions. The analysis can also include determining code features which were used or executed prior to a particular point, such as the discovery of an error or a performance issue.

By comparing the changed code features with the executed code features, the potential sources of error or defects can often be greatly reduced. For example, if a particular method was changed in a code version, but not called during execution, it is less likely to be the source of an error than a method which was both changed and called. Similarly, a changed, called method is more likely to be the source of an error than a method which was called, but was unchanged compared with prior versions of the code where the error was not observed.

The present disclosure can help enhance the performance of debugging operations, including computer-assisted methods. For example, the present disclosure can allow regression tests to be run against fewer code versions, as code versions with unchanged code features can be omitted from the analysis. Similarly, tests can be limited to those that might implicate the particular code features indicated as potentially relevant to the code behavior of interest.

Example 2—Identification of Code Features Potentially Associated with Code Behavior FIG. 1 presents an overview of an embodiment of the present disclosure for identifying potential sources of code behaviors of interest. For example, the embodiment may be used to identify potential sources of runtime errors or performance issues. However, the embodiment may be used for other purposes. In some cases, for example, it may be desirable to identify potential sources of improved code behavior (including, in particular examples, the absence of an error or improved performance). It may be desirable to identify potential sources of other code behaviors.

FIG. 1 illustrates a behavior analysis engine 106. The behavior analysis engine 106 can include a comparison engine 112. The comparison engine 112 can be used to compare a first code version (or code features thereof) with one more comparison code versions (or code features thereof). The comparison engine 112 can be used to generate a list of one of more features 116 of the code which have changed between the first code version and the comparison code versions. The features can include, for example, abstract data types, such as classes. The features can also include elements of abstract data types, such as methods associated with classes. In at least some cases, a "code feature" is a functional unit of code. That is, changes to code, and execution or usage of code, can be determined at a functional unit level (e.g., classes or methods) rather than comparing lines of code to determine textual changes to the code, such as without providing an indication of the functional unit associated with the code changes.

The behavior analysis engine 106 also includes an execution monitor 120. The execution monitor 120 determines code features 124 which have been called, executed, invoked, instantiated, or otherwise used by a program. For example, the execution monitor 120 may determine abstract data types, such as classes, which have be instantiated, methods (such as class methods) which have been called, libraries which have been accessed, APIs used, etc. In a particular example, the execution monitor 120 monitors a call stack, such as a Java call stack, to determine code features, such as methods, called or otherwise used during code execution.

The behavior analysis engine 106 compares the changed features 116 with the executed features 124 to determine code features 130 which are likely associated with the behavior of interest. For example, the behavior analysis engine 106 may determine that a code feature 130 is likely associated with the behavior of interest if the code feature is included in both the set of changed features 116 and the executed features 124. However, in other aspects, the behavior analysis engine 106 may operate in a different manner.

For example, a code feature may be determined to potentially be associated with the behavior of interest if there is less than an exact correspondence between the changed features 116 and the executed features 124. In some aspects, at least one called, unchanged code feature related to a changed, called feature can be flagged as being potentially relevant to the code behavior. That is, a change to the called code feature may expose previously undetected or unappreciated behavior in related code, even if the related code was not changed in the particular code version being analyzed. For example, a called, but unchanged method in the same class as a called, changed method may be indicated as potentially relevant to the behavior of interest.

In other cases, more than exact correspondence between a changed feature 116 and an executed feature 124 may be required before the code feature is determined to be potentially associated with the behavior of interest. In a particular implementation, a code feature is indicated as potentially associated with the behavior of interest if has been executed (and, optionally, changed) and multiple other code features of the class have changed and/or been executed, with at least one code feature being both changed and executed.

In further aspects, additional criteria can be used in determining whether a code feature is potentially of interest. For example, code changes by certain developers or programmers may be flagged as being more likely to be of interest or less likely to be of interest. In particular cases, code by a particular developer or programmer may always be selected as potentially relevant if it has changed and was called. In other cases, code by a particular developer or programmer may always be excluded as potentially relevant even if has changed and was called.

In a further example, the comparisons of different code versions can be weighted or ranked. For instance, more recently changed code versions may be weighted more heavily than older changed code versions. So, a method changed compared with a more recent code version may be ranked higher than a method changed compared with an older code version.

The frequency a code feature was changed may also be used to help determine the potential relevance of code features. For example, if the code feature was changed frequently within a relevant time period, it may be indicated as more likely to be relevant to a code behavior than less frequently changed code features. Similarly, the frequency of which a code feature was called may be used to help determine the potential relevance of code features to a code behavior. For example, if a code feature was executed a higher number of times, it may be determined to be more (or, in some cases, less) likely to be relevant to the behavior of interest than less frequently executed code features. Code features executed more closely in time to the observance of the behavior can be determined to be more likely relevant than code features executed further in time from the observance of the behavior.

The relatedness of code features can also be used to provide an indication of whether a code feature is potentially associated with the code behavior of interest. That is, if a number of related code features are called in association with the behavior of interest, and at least one of the code features was changed, it may be more likely that some or all of such code features may be related to the behavior of interest. In turn, if multiple methods of a particular class have changed or been called, it may be more likely that the class is associated with the behavior of interest.

Figure 2:
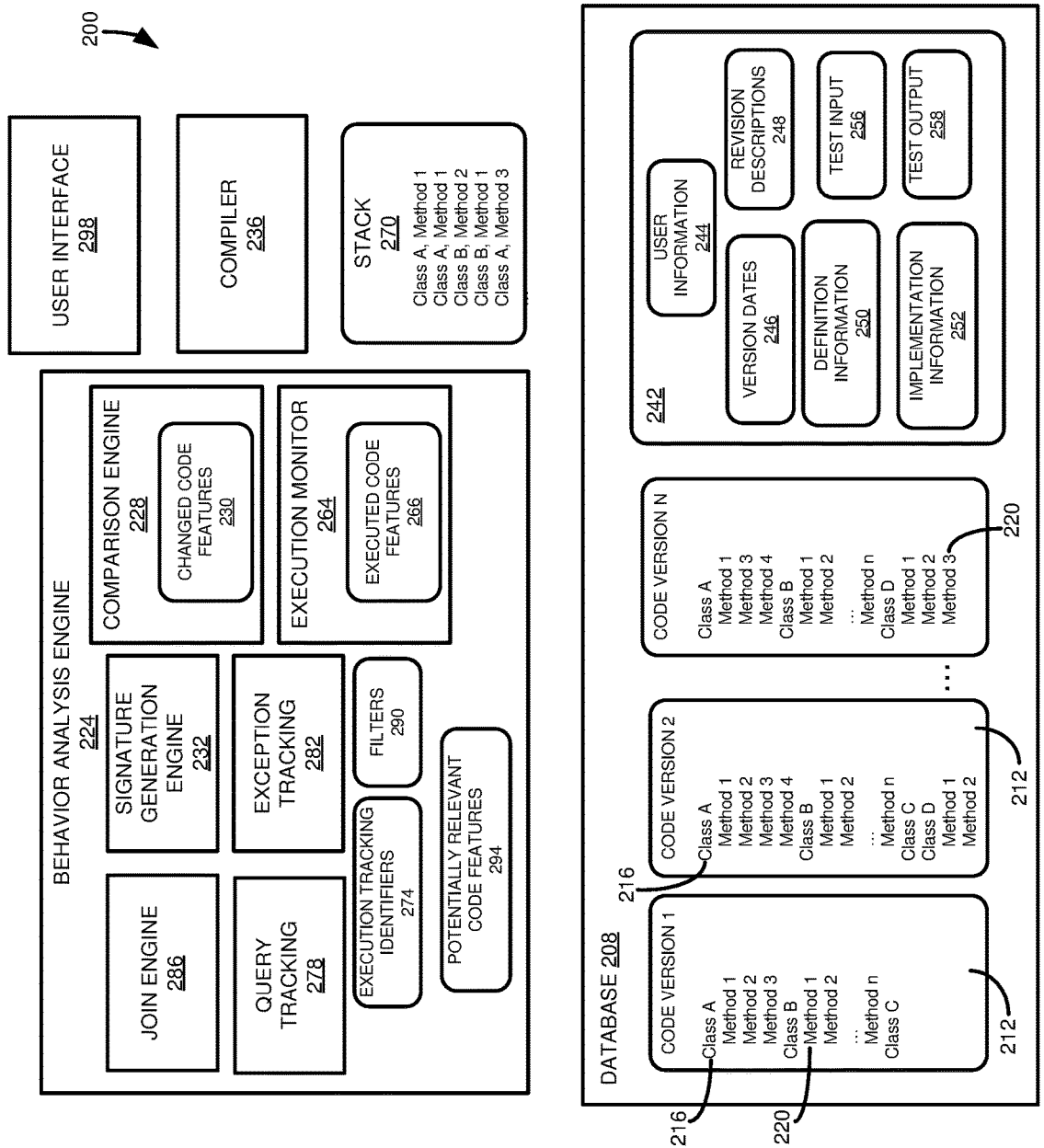
FIG. 2 is a block diagram illustrating an example software architecture in which a behavior analysis engine can communicate with a database and other components to identify code features potentially associated with a code behavior of interest.

FIG. 2 is a block diagram providing an example software architecture 200 that can be used in implementing at least certain embodiments of the present disclosure. The architecture includes a database 208 or other data repository or data storage. The database 208 can be, or can be part of, a SCM system.

The database 208 can include a plurality of code versions 212. Each of the code versions 212 can include one or more classes 216. Classes 216 can include zero or more methods 220. For example, Class C of Code Version 1 includes no methods, while Class A of Code Version 1 include a plurality of methods. Although this FIG. 2 is described with respect to classes and methods, it should be appreciated that the discussion can apply to other types of code features.

At least some of the code versions 212 differ from one another. For example, Code Version 2 includes a Method 4 of Class A not present in Code Version 1. Code Version 2 includes a Class D not present in Code Version 1. Method 2 of Class A of Code Version 2 is not present in Code Version N.

In addition to added or deleted classes 216 or methods 220, the content of a class or method can be different between two code versions 212. For example, a first version of a class 216 or a method 220 can include more, less, or changed code than a second version. As an example, consider the following class associated with a first code version:

```
public class TestClass
{
    public int inc(int n)
    {
        return n + 1;
    }
    public int add(int m, int n)
    {
        return m+n;
    }
}
```

Consider further that the class was updated in a second code version to:

```
public class TestClass
{
    public int increment(int n)
    {
        return n;
    }
    public int add(int m, int n)
    {
        return m+n;
    }
}
```

Each definition of TestClass includes methods intended to increment an integer and to return the sum of two integers. However, the second code version erroneously fails to increment the input parameter "n". In addition, the second code version changes the name of the increment function from "inc" to "increment."

Differences between code versions can be determined using a comparison engine 228. The comparison engine 228 can be part of a behavior analysis engine 224. The behavior analysis engine 224, in at least some cases, can be at least analogous to the behavior analysis engine 106 of FIG. 1.

The comparison engine 228 determines changes in code features between code versions. For example, the comparison engine 228 can determine whether classes 216 or methods 220 have changes between code versions 212. The comparison engine 228, in at least some implementations, can store changed code features 230. In other implementations, changed code features 230 can be stored or maintained by another component of the architecture 200.

Code changes can be determined using any suitable method. For example, source code text may be compared (such as on a character by character basis) to determine whether a class 216 or its methods 220 have changed. Syntactic rules can be defined to identify class 216 and method 220 declarations and definitions, which can assist in identifying new, deleted, or changed classes or methods between code versions 212.

In a further aspect, a signature can be generated for a code feature, such as a class or a method, by a signature generation engine 232 of the behavior analysis engine 224. For example, one or more attributes of the code feature can be used to generate a signature, such as using a hash function. Attributes that can be used to generate a signature include access type (e.g., public, private, protected), return type (e.g., void, int, char, abstract data types, pointers, etc.), name (method or class name), number of parameters associated with a method, parameter types used by the method (e.g., void, int, char, abstract data types, pointers, etc.), parameter names, and information regarding class data members, including the number of data members, the types of the data members, and the names of the data members. Some, all, or additional attributes can be used to generate a signature for a code feature. In some cases, a signature may be generated for a code feature in another manner.

Attributes of a code feature may be combined in order to generate a signature, which can be referred to as a definition (or structure) signature. For example, a plurality of attributes can be concatenated, and the concatenated value used as a signature. In further examples, the signature can be used to generate another identifier, such as a hash value obtained by submitting the signature to a hash function. Typically, using a larger number of attributes to generate a signature allows finer code differences to be detected. For example, using only method names to generate signatures may result in two code versions being identified as the same if the differences in the code involved another attribute (for example, the number of arguments). Similarly, it can be beneficial to include in the value used to generate a code signature attributes which are likely to be associated with a code behavior of interest. For example, at least in some cases, a changed method name may be less likely to result in a runtime error than the type of a method parameter.

In some cases, in addition to, or in place of, using attributes to detect code feature changes, all or a portion of the code implementing a code feature can be used to detect code feature changes. Code can be compared character by character, in some cases, to detect code changes. In other cases, values derived from the code can be used to detect code feature changes. Any value useable to compare code text can be referred to as an implementation (or operations) signature. For example, the text in a code segment can be concatenated (in some cases, with whitespace or new line indicators removed) and used an implementation signature. The concatenated code can be submitted to a hash function to produce a hash value associated with the code feature. The hash value can also serve as an implementation signature for the code feature.

In a particular aspect, both code attributes and code text can be used to determine whether two versions of a code feature are different. In an implementation, code attributes or a definition signature can be used to determine whether particular code features are present in two (or more) code versions. For example, if the code attributes are different between the two code versions, or the definition signatures are not the same, this may indicate that one or more code features (e.g., classes or methods) are present in one code version but not in another code version.

Referring again to FIG. 2, comparing the methods of Class A (or the digital signatures or hash values of the methods) between Code Version 1 and Code Version 2, Code Version 2 includes a Method 4 not present in Code Version 1. Thus, the comparison would identify Method 4 as an added method. Comparing the methods of Class A between Code Version 2 and code Version N, code Version 2 includes a Method 2 not present in Code Version N. Thus, the comparison would identify Method 2 as a deleted method.

If the attributes or definition signatures are the same for code features of two or more code versions, it may indicate that the code versions have common code features. However, having common code features does not require that the code features have identical implementations. Accordingly, the code implementing a code feature, or implementation signatures, can be compared between two (or more) code versions to detect whether code features have changed. For example, the comparison can be carried out if both code versions have code features with the same definition signature.

In other cases, changes to code features can be determined in another manner Typically, any method of determining changes can be used so long as it allows the associated functional unit/code feature (e.g., class, method) of the code to be determined. In particular implementations, the changes can be determined using an intermediate representation of the code, including an intermediate language. The intermediate language representation of the source code can be produced by a compiler 236. Immediate representations can include data structures or code useable by a compiler or a virtual machine corresponding to source code. In a particular example, the intermediate representation is Java bytecode.

For instance, the Java bytecode representation of the first TestClass provided above is:

```
public class com.sf.APITestUtil.TestClass {
public TestClass( );
0 aload_0(this)
1 invokespecial java.lang.Object( ) [8]
4 return
Line numbers:
    [pc: 0, line: 3]
Local variable table:
    [pc: 0, pc: 5] local: this index: 0 type: com.sf.APITestUtil.TestClass
//Method descriptor #15 (I)I
//Stack: 2, Locals: 2
public int inc(int n);
0 iload_1[n]
1 iconst_1
2 iadd
3 ireturn
Line numbers:
    [pc: 0, line 5]
    Local variable table:
    [pc: 0, pc: 4] local: this index: 0 type: com.sf.APITestUtil.TestClass
    [pc: 0, pc: 4] local: n index: 1 type: int
//Method descriptor #19 (II)I
//Stack: 2, Locals: 3
public int add(int m, int n);
0 iload_1[m]
1 iload_2[n]
3 iadd
4 ireturn
Line numbers:
    [pc: 0, pc: 4] local: this index: 0 type: com.sf.APITestUtil.TestClass
    [pc: 0, pc: 4] local: m index: 1 type: int
    [pc: 0, pc: 4] local: n index: 2 type: int
}
```

The bytecode includes information sufficient to generate definition signatures and implementation signatures. In particular, the bytecode sets forth three classes: a constructor (TestClass( ), the inc method, and the add method. Definition signatures can be generated by concatenating the access types, return types, methods names, argument numbers, and arguments types for each of the methods:

Definition Signature constructor: publicTestClass0null
Definition Signature inc: publicintinc1int
Definition Signature add: publicintadd2intint In some cases, the signatures can be used to generate a hash or other digest value.

To generate the implementation signatures, all or a portion of the operations associated with each function can be concatenated and, optionally, submitted to a hash function. The signatures to be hashed for the three methods are:

Implementation Signature constructor: iload_0return
Implementation Signature inc: iload_1[n]iconst_iiaddireturn Implementation Signature add: iload_1[m]iload_2[n]iadd ireturn In some cases, the attributes, or the attributes' associated code or operations, can be stored, such as for use in generating a signature or other identifier (e.g., a hash value). The information can be stored in an abstract data type or data structure. In a particular example, information relevant to code features or the underlying code can be defined as an abstract data type, and an array of the abstract data type can be used to represent the particular code features associated with a particular code version.

The database 208 can include a store 242 for information related to the code versions 212. For example, the database 208 can store user information 244. User information 244 can identify a user associated with a particular code version 212. User information 244 can be used, among other things, to associate code changes with a particular user. In a particular case, the comparison engine 228 can associate changed code features 230 with a particular user associated with a code version 212 resulting in the changed code features.

The store 242 can include code version dates 246 associated with the code versions 212. The code version dates 246 can represent, for example, the date a code version 212 was entered into the database 208 or last modified. In some cases, the code version dates 246 can be used to sequence comparisons of code versions 212. For example, by comparing dates of two code version 212, it can be determined which code version modified another code version. However, in other aspects, the chronological sequence of code versions 212 can be determined in another manner, such as by using identifiers associated with the code versions (such as a counter that increments on each update). Code version dates 246 can also be used in performing queries regarding code changes. For example, a user, or the comparison engine 228, may seek to compare code versions 212 created or modified within a particular time period.

Revision descriptions 248 regarding revisions or changes to the code versions 212 can be included in the store 242. The revision descriptions 248 can be, for example, descriptions entered by a user (such as a user associated with the user information 244) when the code version 212 was created or updated in the database 208. The revision descriptions 248 can be used to help identify changes to the code version 212 compared with a prior or subsequent code version. If the behavior analysis engine 224 identifies a code feature as potentially being associated with a behavior of interest, the revision descriptions 248 of the corresponding code version 212 can be reviewed to help determine the source of the behavior of interest. In particular, the revision descriptions 248 can be reviewed for information related to the code feature potentially associated with the behavior of interest.

Definition information 250 and implementation information 252 can be included in the store 242. The definition information 250 can include information about code features of code versions 212, such as attributes of classes or methods associated with the code versions. The definition information 250 can also include definition signatures associated with code features of the code versions 212, such as signatures generated by the signature generation engine 232.

Similarly, the implementation information 252 can include code or information about code associated with code features of the code versions 212. For example, the implementation information 252 can include code (or identifiers useable to identify corresponding code in a code version 212) associated with a code feature of a code version, or implementation signatures associated with the code versions, such as using the signature generation engine 232. The definition information 250 and the implementation information 252 can be used by the comparison engine 228 to determine changed code features between code versions 212.

As described above, this Example 2 can involve identifying a code feature potentially related to a code behavior of interest by analyzing changed code features and executed code features. In some cases, predetermined operations may wish to be carried out on the code to test for particular behaviors, such as runtime errors. The predetermined operations, such as in the form of a script, can be stored in a test input store 256. The stored input 256 may allow for automated, consistent testing for various code behaviors.

The store 242 can also include a test output store 258. The test output 258 can represent program output generated during execution of a testing scenario of the input store 256, or of other testing or code execution. The test output 258 can include data output during execution and any runtime errors or other error messages produced while executing an input scenario 256, or other input. The test output 258 can also include performance information associated with executing an input scenario 256, or other input, such as CPU, memory, or network usage.

Turning to the behavior analysis engine 224, in addition to the comparison engine 228, the behavior analysis engine can include an execution monitor 264. The execution monitor 264 can determine code features, such as classes 216 or methods 220, executed, called, invoked, constructed, instantiated, or otherwise used during execution of a code version 212, for inclusion in a store 266 for executed code features.

In a particular implementation, the execution monitor 264 can monitor a stack 270, such as a call (execution) stack, associated with the execution of a code version 212. The execution monitor 264 can perform other functions, such as capturing input or output associated with code execution (for example, queries executed by a user or data returned to a user), logging errors (such as runtime errors), logging the values of variables or return values, or logging the point (e.g., code segment) where a method was called, or to which control should be returned after the method has finished executing.

The execution monitor 264 can obtain or store information regarding the execution of a code version 212, including information about active subroutines (e.g., methods). When the execution monitor 264 monitors (and logs) the call stack 270, the call stack can be accessed by any suitable means. For example, at least certain programming languages, such as Java, provide access to information regarding the call stack. An application program interface can be used by the execution monitor 264 to access and record information regarding the call stack 270.

In at least some cases, an identifier can be associated with code whose execution is to be monitored. The identifier can allow execution of the monitored code to be distinguished from other code that may be running at the same time. The identifier can also be stored with execution information obtained by the execution monitor 264, which can, for example, be used to retrieve particular execution information, such as for use by the comparison engine 228. In some examples, the identifier can be registered with a particular execution thread.

In a specific example, when code to be analyzed is written in Java, the call stack 270 can be monitored using a marker interface or an annotation. The marker interface or annotation can be used to designate that all or a portion of a code version 212 be executed in association with a virtual stack. The virtual stack can be used to log all or a portion of the operations of the call stack 270. In some cases, only a portion of code execution, such as particular methods, is desired to be tracked. In such cases, the executed code can be filtered, such as by only sending certain code features to the virtual stack, or only logging the selected code features. In such cases, the virtual stack may have a depth that differs from the real call stack 270.

In a particular implementation of the virtual stack, a variable can be used to track the virtual stack depth. The original local variable index can be incremented by one, and index 0 can be used as the depth tracking variable for any methods associated with the virtual stack. When a method is executed in association with the virtual stack, a "go marker" can be used to return the virtual stack depth, which can be saved in the local variable (index 0) for the current method.

The "go marker" function can get the current depth of the virtual stack (as the return value) and push the passed method onto the real stack. In a particular implementation, the go function can include arguments of a class name (such as of type String or char*) and a method name (such as of type String or char*). In at least some cases, the method can be associated with an identifier or signature, which can be used to help identify calls to the method during execution. An example declaration of the "go marker" function can be:

```
int go (String className, String methodWithSignature)
{
    //implementation
}
```

A "back marker" function can be used to track the termination of invoked methods. The stackDepth variable (corresponding to the current method's local virtual stack depth variable (go)) can be used to tell the system what method the virtual stack is going back to. The "back" function can be called before any return statement, so the current method can be detected as terminated. An example declaration of the "back marker" function can be:

```
void back (int stackDepth)
{
    //implementation
}
```

A "bound marker" function can be used to restore the state of the virtual stack before the execution of subsequent method calls. An example declaration of the "bound" function can be:

```
void bound (int stackDepth)
{
    //implementation
}
```

Figure 3:
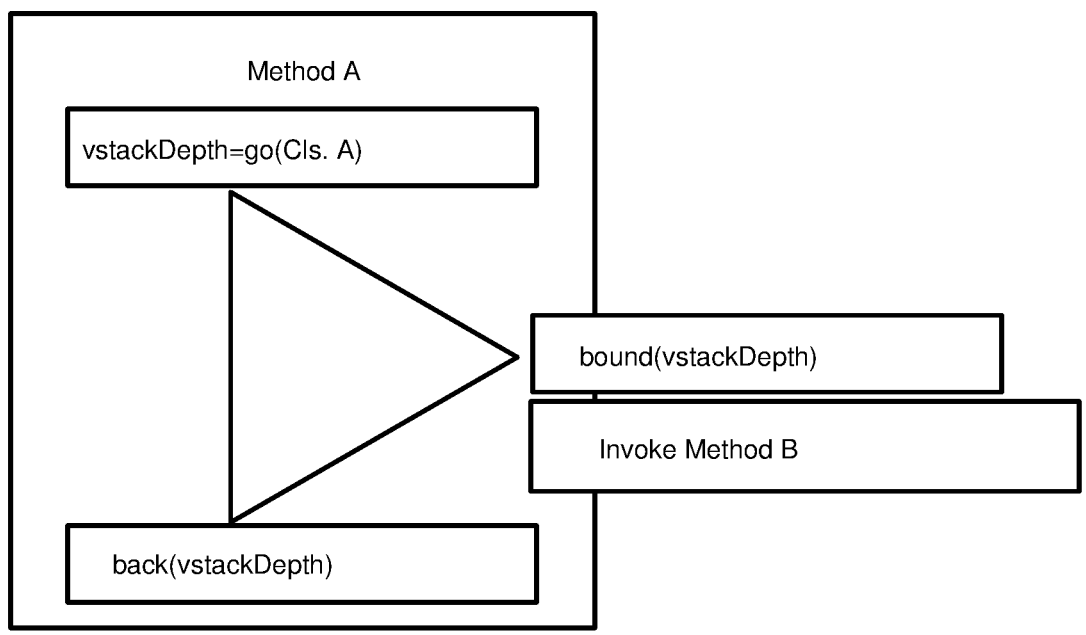
FIG. 3 is diagram schematically depicting a stack tracing method according to an embodiment of the present disclosure.

The combination of the "go," "bound," and "back" methods can be used to locate the current stack. As shown in FIG. 3, visually, the three methods can form a triangle.

In some cases, it can be desirable to reset a virtual stack, such as a virtual stack associated with a particular thread. For example, it may be desirable to clear the stack in response to a user request, or when the virtual stack should start (or restart) tracking operations after a particular method is called. An example declaration of a reset function can be:

```
void reset( )
{
    //implementation
}
```

The virtual stack can be used to construct a record stack, the history of the tracked call tree. The record stack can record all (or a desired portion of) the invocation history and can be used to construct the call stack. The record stack can also be used to filter a portion of the invocations. For example, the record stack can remove duplicated stack frames, such as in association with a loop (for example, a recursive loop). Thus, in at least some cases, if a method is called successively 100 times, it can be tracked as a single call. Such filtering can aid in reviewing and interpreting the execution results, such as determining what classes and methods were executed.

In at least some cases, the executed classes and methods can be extracted from the record stack and provided as a list, such as for review by a user or for later analysis. That is, in some cases it may be useful to review the actual call stack (or a portion thereof). In other cases, it may only be necessary or desirable to determine what classes or methods were executed, not their order, frequency, or dependency.

In other embodiments, the execution monitor 264 operates in a different manner. For example, the execution monitor 264 may obtain or record the contents of the call stack 270 in a different manner, such as using built in commands in programming languages providing such support, or through the use of appropriate function libraries. For example, the Java programming language provides commands for both obtaining the contents of the stack (including printing the contents) and for obtaining the current stack contents for a particular thread.

Returning again to FIG. 2, as discussed above, in at least some implementations, it can be useful to associate code execution, such as executed by a particular thread, with a particular identifier, such as an identifier associated with a particular user. Such identifiers can be associated with the executed code features 266 of the execution monitor 264. The identifiers can be stored in an execution tracking identifier store 274, which can also store information regarding a particular analysis task or user associated with the code execution. When multiple processes are running, associating the executed code features 266 with a particular identifier can also facilitate locating executed code features within the call stack 270. That is, only a portion of the call stack 270 may be relevant to the execution of particular code, and the identifier may be used to separate such stack calls from stack calls related to other code. The identifiers may also be used, for example, as a filter to produce the virtual stack (or the record stack) discussed above.

Additional information regarding code execution can be obtained and stored. For example, when the code involves database operations, a query tracking component 278 can be used to track queries, such as SQL operations, carried out during program execution. More generally, the behavior analysis engine 224 can include a component to obtain and store input, output, or intermediate values (such as variable values) associated with code execution.

An exception tracking component 282 can be used to track various errors, including error messages, generated during code execution. For example, the exception tracking component 282 can be used to record runtime errors associated with code execution. Error information can include information such as the nature of the error, the time the error occurred, code features that were being executed when the error occurred, values associated with execution of the code (variable values), and system information associated with the code execution, such as memory use, processor use, network use, or programs or processes running concurrently with the executed code.

The behavior analysis engine 224 can include a join engine 286. The join engine 286 can determine code features executed during execution of a code version 212, such as by accessing the executed code features store 266, and which have been changed compared with one or more prior code versions, such as by accessing the changed code features store 230. The code features identified by the join engine 286 can be those code features present in the changed code features store 230 and the executed code features store 266 which are associated with a particular code version 212 of interest.

The join engine 286 can apply selection factors to limit those results, such as by applying filters 290 (for example, filters limiting the results to particular code features or users) or by selecting code features associated with particular execution tracking identifiers 274. The join engine 286 can produce a set 294 of code features potentially associated with a code behavior of interest.

The architecture 200 can include a user interface 298. The user interface 298 can allow a user to interface with other components of the architecture 200, including the behavior analysis engine 224 and, optionally, the database 208. For example, the user interface 298 can allow a user to select code versions 212 to be analyzed and executed, and to display to the user contents of the database 208 or the behavior analysis engine 224.

Figure 4:
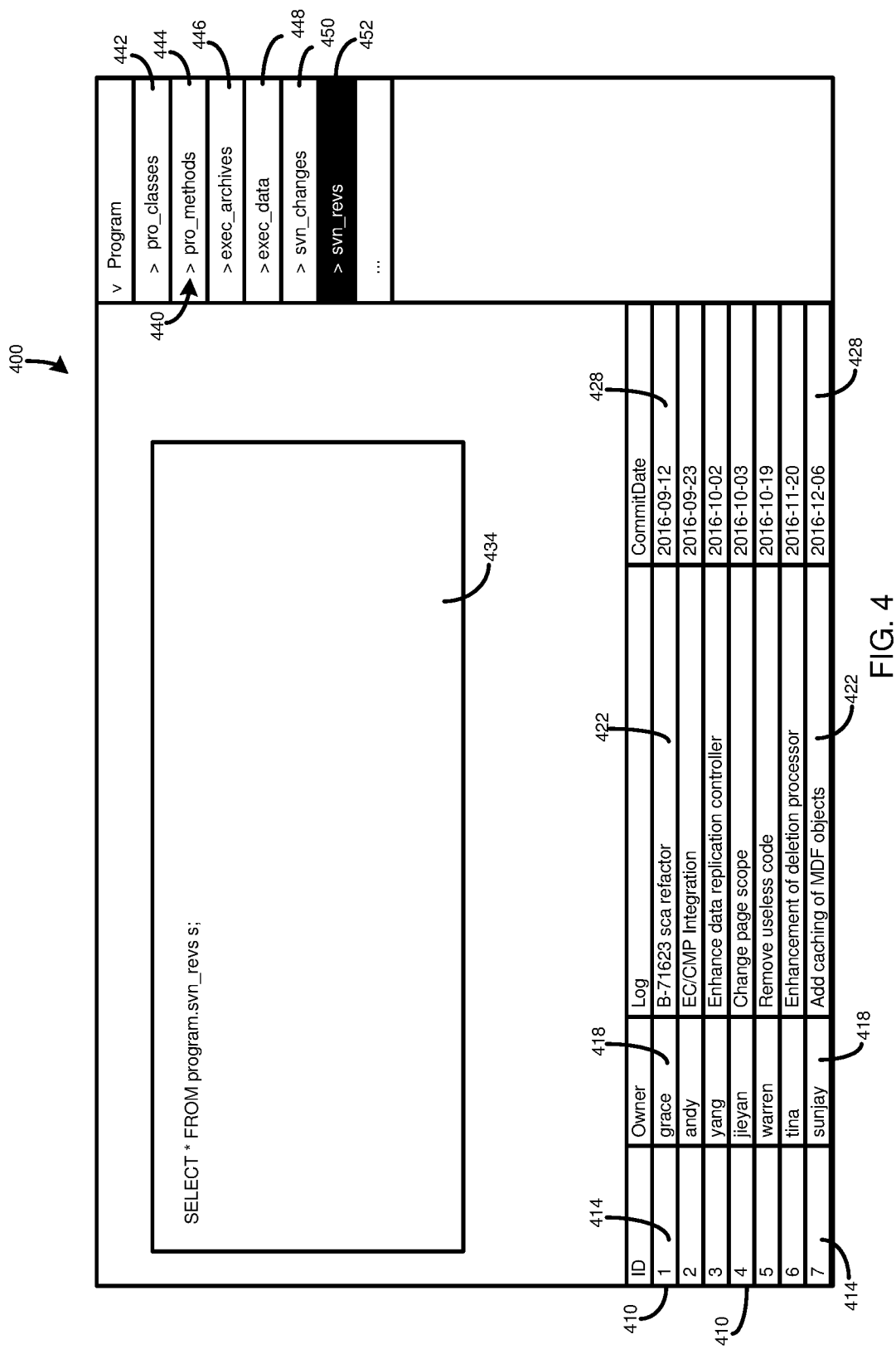
FIG. 4 is a diagram of an example screen for displaying information regarding code versions that can be used to identify code features potentially associated with a code behavior of interest.

FIG. 4 is a diagram of an example screen 400 for displaying to a user information regarding a plurality of code versions 410. For example, the screen 400 may be displayed using the user interface 298 of FIG. 2 and can display information associated with the code versions 212, or other information of the database 208 or the behavior analysis engine 224.

For the various code versions 410, the screen 400 can include an identifier 414. The identifiers 414 can be used to identify a particular code version 410. In some cases, the identifiers 414 can be numerical identifiers, such as integers. The identifiers 414 can be incremented each time a new code version 410 is entered into the database 208, for example. In other embodiments, the identifiers 414 can have a different format or can be determined in a different manner.

The screen 400 can also list one or more owners 418 (e.g., programmer, developer) associated with a code version 410. The owner 418 may be, for example, an individual who coded changes to the code version 410 compared with a prior code version, or a person who designed or oversaw code changes reflected in the code version. As discussed above, in at least some cases, the owner 418 can be used to help determine whether changes reflected in a particular code version 410 should be flagged as potentially associated with a code behavior of interest.

Descriptive information 422 associated with a code version 410 can be displayed on the screen 400. Descriptive information 422 can include, for example, information relating to changes made to a code version 410 compared with another code version. The descriptive information 422, in some cases, may be useful in identifying the source of a code behavior of interest. That is, once a code feature has been identified as potentially associated with the behavior of interest using an embodiment of this Example 2, the descriptive information 422 of the corresponding code version 410 can be reviewed to determine whether the descriptive information relates to the identified code feature and may describe changes that are associated with the behavior of interest.

The screen 400 can also include information regarding one or more dates 428 associated with the code versions 410. The dates 428 may represent, for example, the date (including a time) the code version 410 was created or updated. In a particular case, the date 428 may represent the time the corresponding owner 418 marked the code version 410 as finalized or committed. As described in this Example 2, the dates 428 may be used to help guide the selection of code features of interest that might be associated with a behavior of interest. For instance, the search for code features might be limited to code versions 410 having been created, modified, committed, etc. on a certain date or within a certain date range.

The screen 400 can include a query field 434 where a user can enter in search criteria to locate information of interest regarding code versions, including the code versions 410. In a particular example, the search criteria can be entered in the form of SQL queries. Search criteria can include searching for code versions 410 having identifiers 414 within a certain range, associated with one or more particular owners 418, having one or more terms in the descriptive information 422, or associated with a particular date 428 or date range. The code versions 410 presented on the screen 400 can be those matching the search criteria of the query field 434.

Navigation icons 440 can be included in the screen 400 to allow a user to view screens showing other information relevant to this Example 2. Navigation icons 440 can include an icon 442 allowing a user to view information related to classes associated with one or more of the code versions 410, an icon 444 allowing a user to view information related to methods associated with one or more of the code versions, an icon 446 allowing a user to view (or access, such to run) archived executable files associated with one or more of the code versions, and an icon 448 allowing a user to view data produced during execution of one or more of the code versions 410.

An icon 450 can allow a user to view changes made to the code versions 410, while an icon 452 can allow a user to view revision information, such as shown on the screen 400. That is, in some cases, code versions 410 can represent particular changes made to a prior code version. In other cases, code versions 410 can be code versions which incorporate multiple code changes, which may themselves be individual code versions, including code versions having different identifiers 414, owners 418, descriptive information 422, or dates 428.

In other embodiments, the screen 400 can include more, less, or different information than shown.

Figure 5:
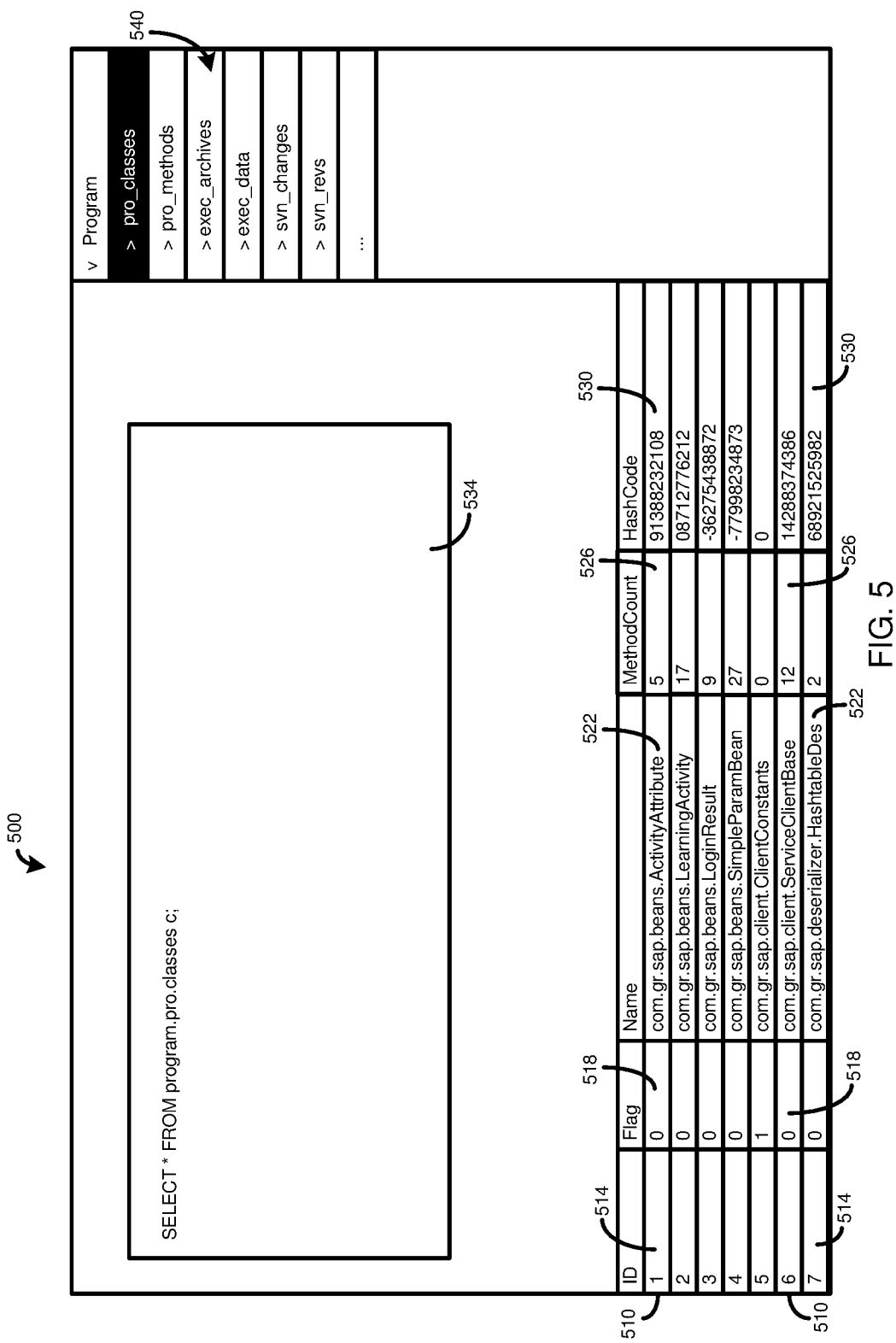
FIG. 5 is a diagram of an example screen for displaying information regarding classes associated with one or more code versions that can be used to identify code features potentially associated with a code behavior of interest.

FIG. 5 is a diagram of an example screen 500 that can provide a user with information regarding the classes 510 of one or more code versions. In a particular example, the screen 500 can be selected using the navigation icon 442 of FIG. 4. In some cases, the classes 510 can represent all of the classes associated with one or more code versions. For example, the classes 510 could represent all of the classes for all of plurality of code versions (for example, all of the code versions 212 of the database 208), all of the classes for a single code version, or classes that have changed between two or more code versions (such as between a code version being analyzed for the source of a particular behavior and one or more earlier or later code versions).

The screen 500 can include a display of an identifier 514 for a particular class 510. The identifier 514 can represent a shorthand or more easily tracked (or searched) identifier for the class than the class name. The identifier 514 may also be used to track classes that are functionally or operationally the same, even though the name of the class may have been changed between code versions.

Information regarding flags 518 associated with a particular class 510 can be displayed on the screen 500. Flags 518 can be used to indicate, among other things, that a particular class 510 has been implicated as potentially associated with a code behavior of interest (such as using an embodiment of this Example 2), or has been added, deleted, or modified between a code version and one or more reference code versions (such as one or more earlier or later code versions).

The screen 500 can display the name 522 of each class 510. In some cases, the display of the name 522 can include a path to the location of the class 510, or a code version containing the class 510. The number of methods 526, if any, associated with each class 510 can be included in the screen 500. The screen 500 can also include a signature 530 or similar value for at least a portion of the classes 510. In some cases, the signature can be generated as described above, including obtaining a hash value. The signature 530, in some cases, can be used to determine whether a class 510 has been changed (such as being added, deleted, or modified) between code versions.

A query field 534 can be included in the screen 500. The query field 534 can allow a user to search, such as using SQL commands, for particular classes 510. For example, a user may wish to search for classes 510 from one or more particular code versions, having one or more identifiers 514, flags 518, names 522, number of methods 526, or signatures 530. The screen 500 can include navigation icons 540, which can be at least generally similar to the navigation icons 440 of FIG. 4. In other aspects, the screen 500 can include more, less, or different information than shown in FIG. 5.

Figure 6:
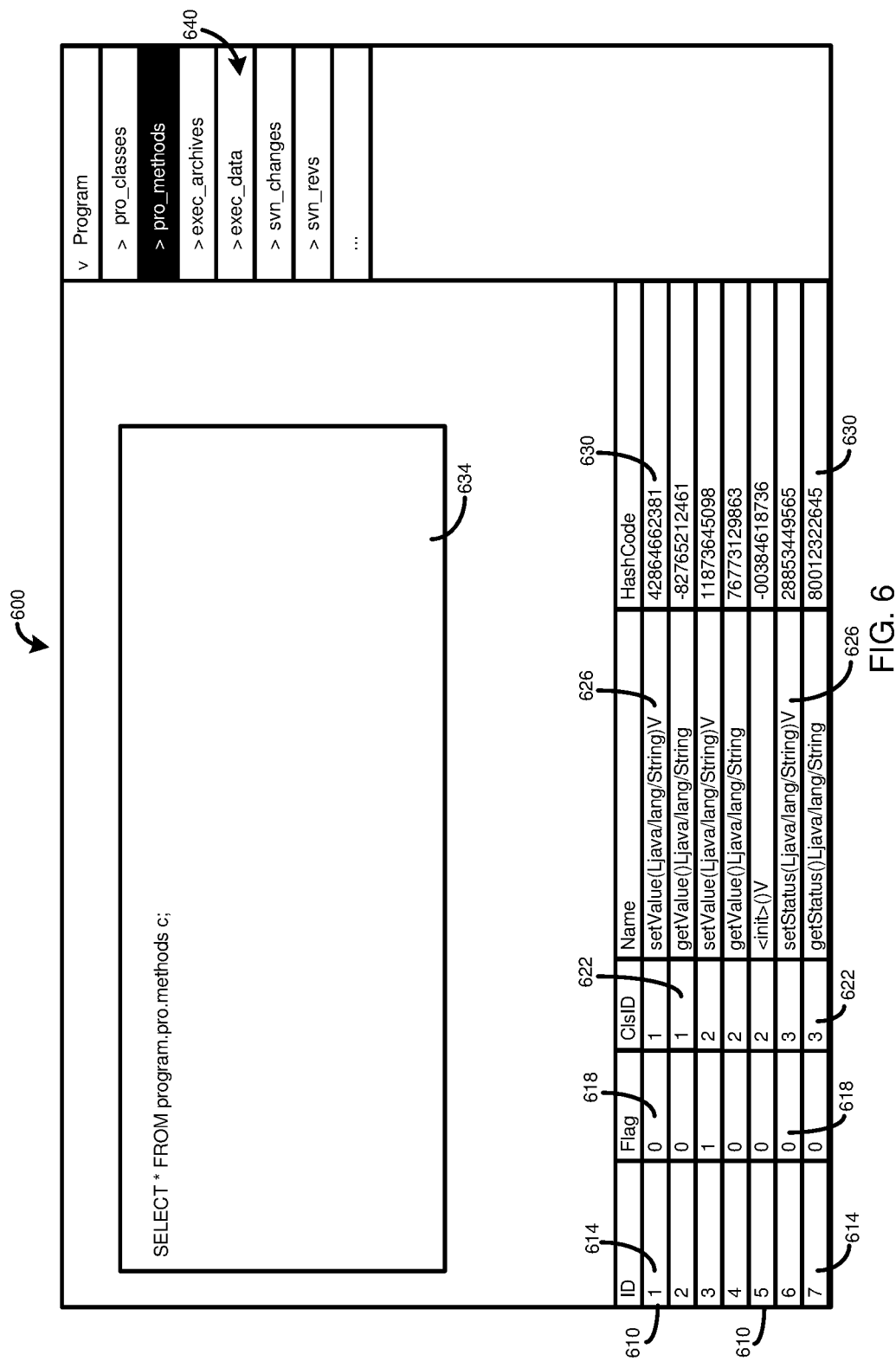
FIG. 6 is a diagram of an example screen for displaying information regarding methods associated with one or more code versions that can be used to identify code features potentially associated with a code behavior of interest.

FIG. 6 is a diagram of an example screen 600 that can provide a user with information regarding the methods 610 of one or more code versions. In a particular example, the screen 600 can be selected using the navigation icon 444 of FIG. 4. In some cases, the methods 610 can represent all of the methods associated with one or more code versions. For example, the methods 610 could represent all of the methods for all of plurality of code versions (for example, all of the code versions 212 of the database 208), all of the methods for a single code version, methods associated with classes that have changed between two or more code versions, or methods that have changed between two or more code versions (such as between a code version being analyzed for the source of a particular behavior and one or more earlier or later code versions).

The screen 600 can include a display of an identifier 614 for a particular method 610. The identifier 614 can represent a shorthand or more easily tracked (or searched) identifier for the method 610 than the method name. The identifier 614 may also be used to track methods 610 that are functionally or operationally the same, even though the name of the method may have been changed between code versions.

Information regarding flags 618 associated with a particular method 610 can be displayed on the screen 600. Flags 618 can be used to indicate, among other things, that a particular method 610 has been implicated as potentially associated with a code behavior of interest (such as using an embodiment of this Example 2), or has been added, deleted, or modified between a code version and one or more reference code versions (such as one or more earlier or later code versions).

A class identifier 622 can be displayed on the screen 600. The class identifier 622 can be used, for example, to indicate a particular class with which the method 610 is associated (such as being a member method of the class). The class identifier 622 can be, in some implementations, the identifier 514 of FIG. 5.

The screen 600 can display the name 626 of each method 610. The screen 600 can also include a signature 630 or similar value for at least a portion of the methods 610. In some cases, the signature can be generated as described above, including obtaining a hash value. The signature 630, in some cases, can be used to determine whether a method 610 has been changed (such as being added, deleted, or modified) between code versions.

A query field 634 can be included in the screen 600. The query field 634 can allow a user to search, such as using SQL commands, for particular methods 610. For example, a user may wish to search for methods 610 from one or more particular code versions, having one or more identifiers 614, flags 618, class identifiers 622, names 626, or signatures 630. The screen 600 can include navigation icons 640, which can be at least generally similar to the navigation icons 440 of FIG. 4. In other aspects, the screen 600 can include more, less, or different information than shown in FIG. 6.

Figure 7:
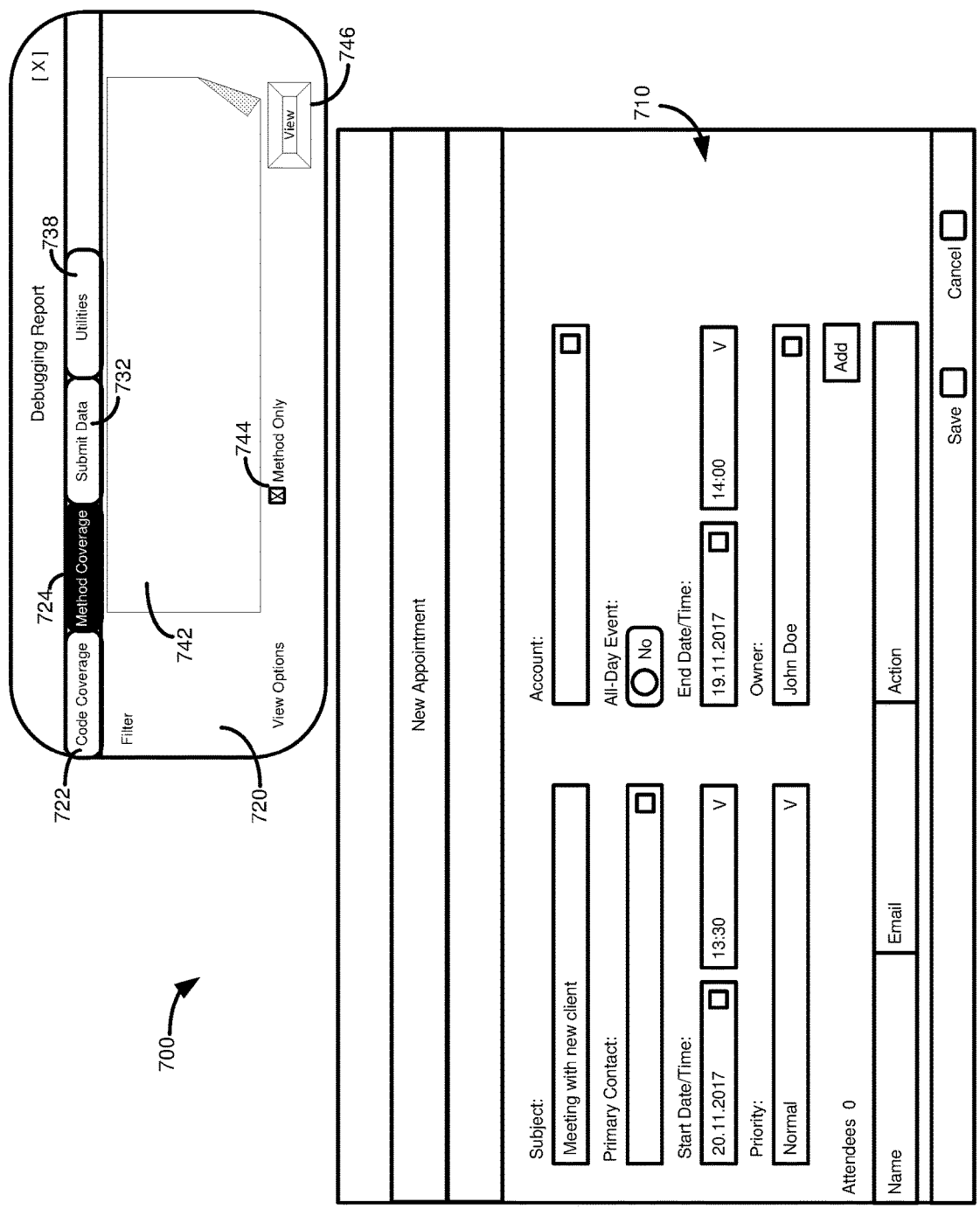
FIG. 7 is a diagram of an example screen for a user interface for a behavior analysis engine according to an embodiment of the present disclosure.

FIG. 7 is a diagram of an example screen 700 that allows a user to investigate a code behavior of interest, such as a software bug, according to an aspect of this Example 2. The screen 700 includes an application 710, which may be, for example, an application produced at least in part by executing a particular code version. The application 710 in FIG. 7 is a calendaring application. However, the code to be analyzed need not implement any particular type of application, and may operate other than to generate an application. That is, the use of this Example 2 for a calendaring application is purely for the sake of example and is not intended to be limiting in any respect.

The screen 700 can include a window 720 providing information and selectable actions relating to identifying code features potentially related to a code behavior of interest. A code coverage icon 722 can allow a user to view, such as in real time, code being executed in the application 710. A method coverage icon 724 can be selected to provide a listing of classes or methods called during execution of a code version (e.g., the code version producing the application 710). The method coverage icon 724 is shown as selected.

A submit data icon 732 can be used to submit stored instructions (for example, a script of actions to be taken by the application 710) to the application. The stored instructions can be used to reproduce specific use scenarios of the application 710 and to test for behaviors of interest without requiring a user to manually interact with the application. A utilities icon 738 can be used to implement an embodiment of this Example 2 for identifying code features potentially related to a code behavior of interest.

The window 720 includes a filter field 742 where a user can enter optional filter criteria. For example, the user may wish to view classes or methods associated with a particular class identifier, a particular user, or a particular thread. A selectable icon 744 can be provided to limit the results to executed methods, or (when not selected) to both methods and classes executed.

Figure 8:
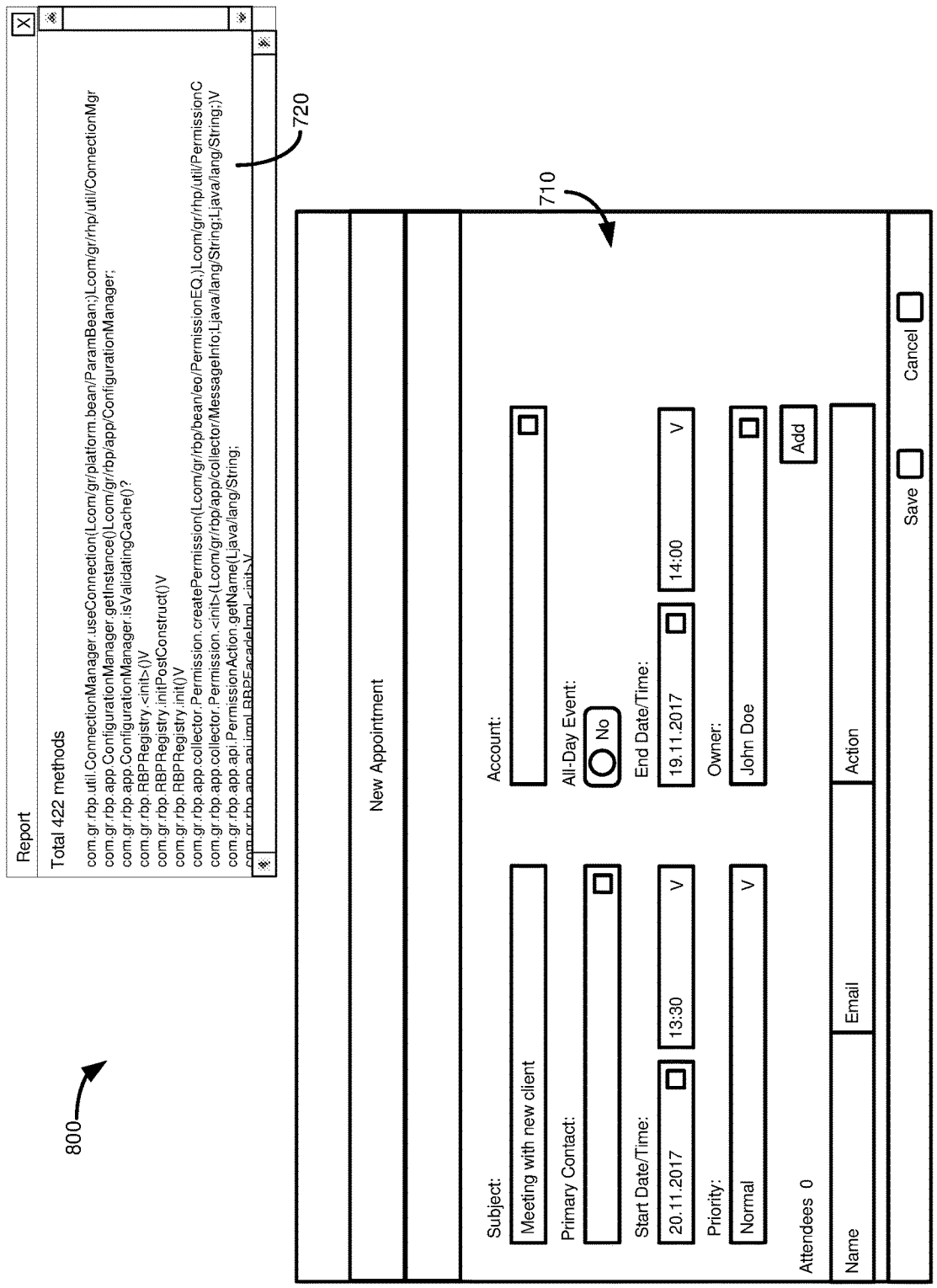
FIG. 8 is a diagram of an example screen for a user interface for a behavior analysis engine according to an embodiment of the present disclosure, depicting a report of methods executed during the execution of an application.

The listing of methods called during execution of the code version can be generated by selecting a view icon 746. FIG. 8 is a diagram of an example screen 800 providing a report generated after selecting the view icon 746.

Figure 9:
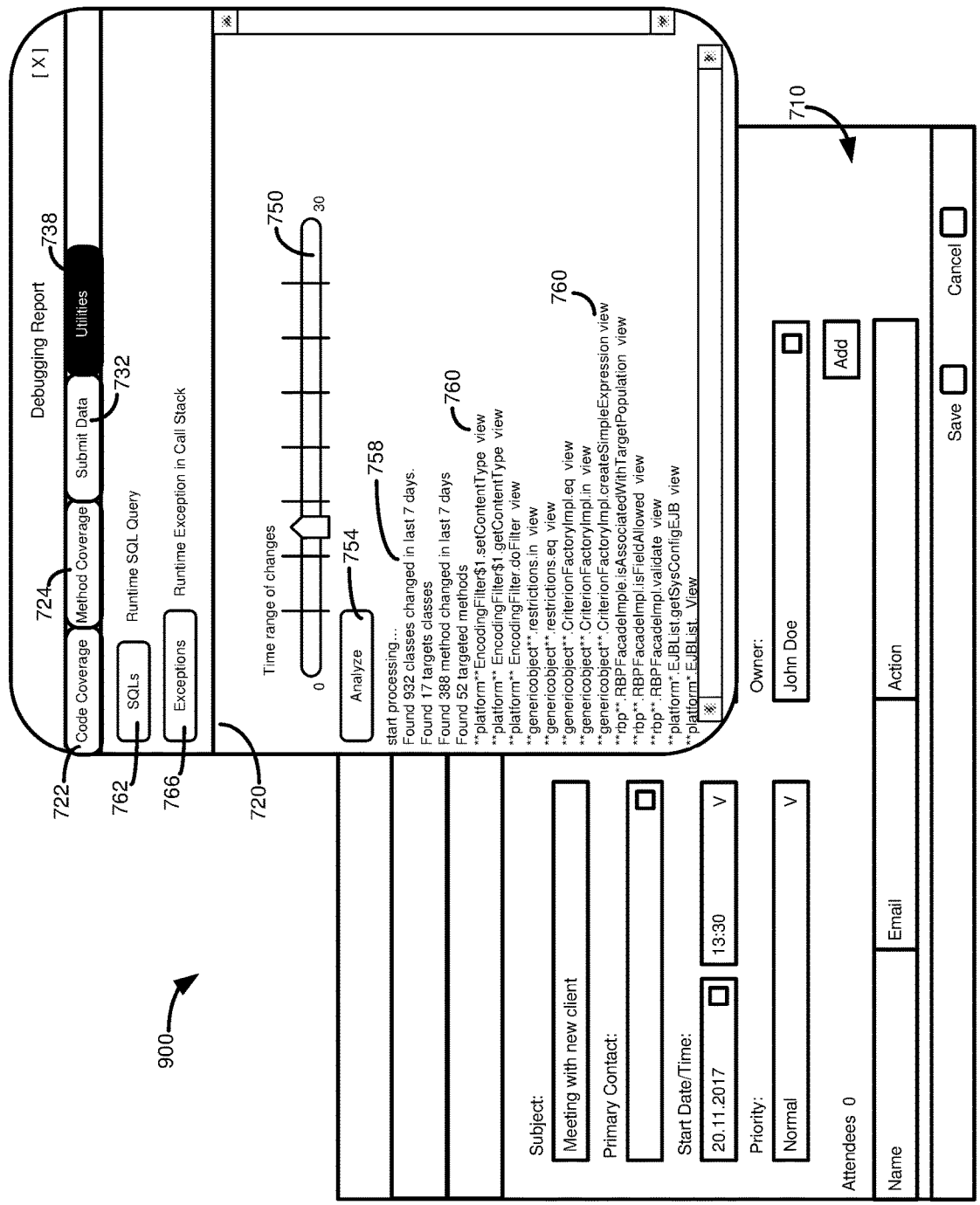
FIG. 9 is a diagram of an example screen for a user interface for a behavior analysis engine according to an embodiment of the present disclosure.

FIG. 9 is a diagram of an example screen 900 that illustrates the window 720 after selecting the utilities icon 738. A selector 750 icon can be provided to allow a user to select a particular date range in which to search for code changes. For example, by selecting seven days, a program implementing a method of this Example 2 can seek to identify code changes/changed code features of interest having occurred in the most recent seven day period. In some cases, the program can compare the currently executing code version to prior code versions within the relevant timeframe to determine code versions having changed code features. In other cases, the determination of changed code features may have already been carried out, and the program can access and query the information to identify the changed code features.

In a further aspect, a user may be allowed to input a date range (including, in a particular example, a starting date and ending date) or otherwise specify a time period to be analyzed. In a yet further aspect, a default time period (including searching all code versions) can be provided, instead of, or in addition to, allowing for a user-selectable time period. In some cases, instead of, or in addition to, dates, other parameters can be used to restrict or filter results, such as specifying particular code versions, a range of code versions, particular users, or keywords in descriptions associated with code versions.

Analysis of code changes can be initiated by selecting the analyze icon 754. A program implementing a method of this Example 2 can search for code features that were executed while the application 710 was running and which were changed within a relevant time period. In some cases, a user can also specify filter criteria to be applied in determining the relevant results. The results 758 can be provided in the window 720. View icons or links 760 can be provided which can cause code associated with the code feature to be displayed, optionally showing changes compared with another code version.

The window 720 can provide additional information. For example, a SQL icon 762 can be provided to allow a user to view SQL operations which were executed (or, in some cases, issued) during execution of the application 710. More generally, a user may be provided with the option to view information submitted to, provided by, or used while executing the application 710. An exceptions icon 766 can be provided to display any errors, such as runtime exceptions, that occurred while the application 710 was running.

Figure 10:
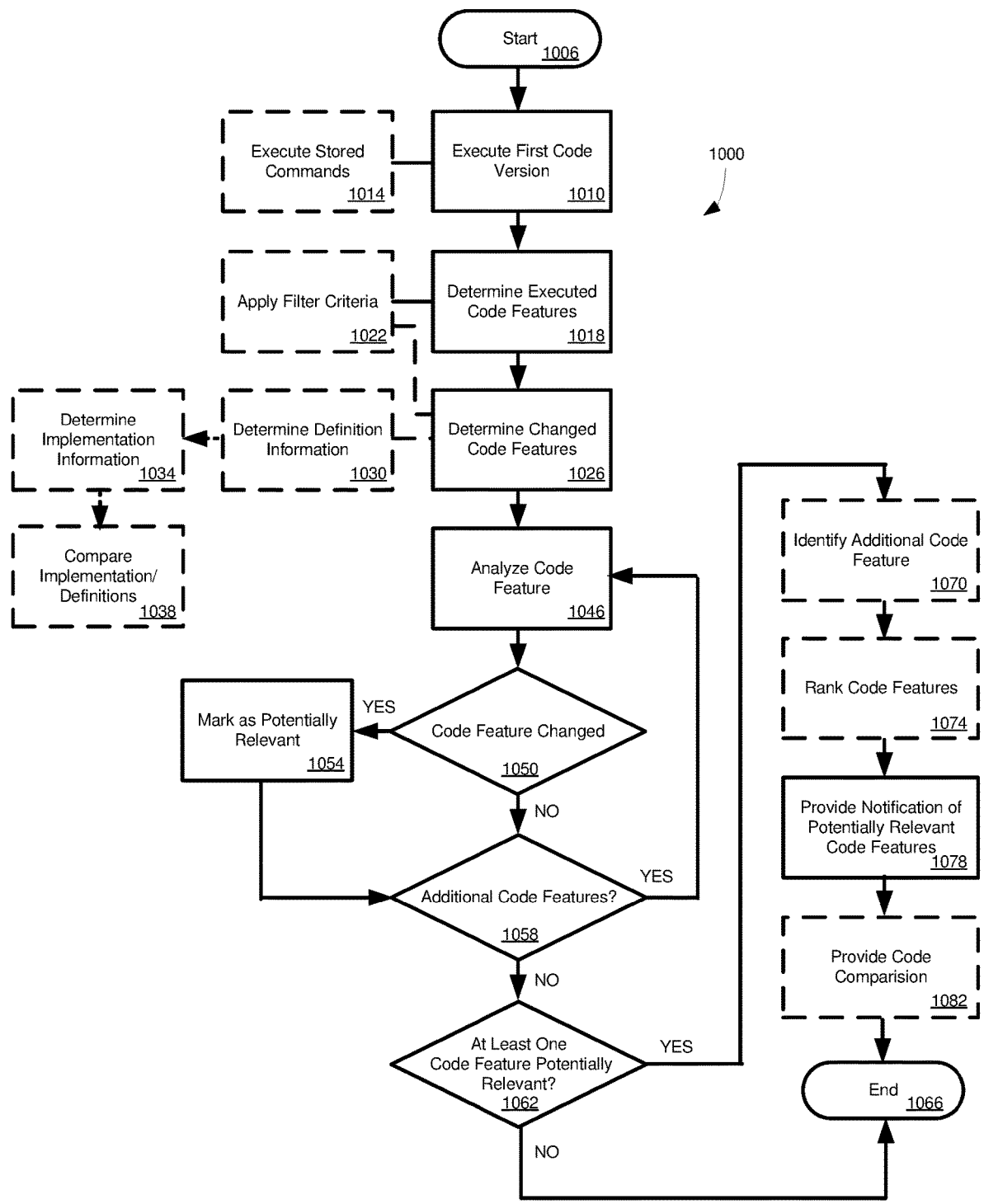
FIG. 10 is a flowchart of a method for identifying code features potentially associated with a code behavior of interest according to an embodiment of the present disclosure.

FIG. 10 presents a flowchart of a method 1000 according to an embodiment of this Example 2. The method 1000 starts at step 1006. In step 1010, a first code version is executed. In optional step 1014, executing the first version include executing stored commands, such as in a script. The stored commands can provide actions to test for a code behavior of interest, such as runtime error (e.g., a software bug).

In step 1018, the method 1000 determines code features executed (such as classes instantiated or methods invoked) during execution of the first code version. In some cases, in optional step 1022, one or more filter criteria can be applied in determining executed code features in step 1018. In various aspects, step 1022 can occur before, after, or concurrently with step 1018. Filter criteria can include specified users, specified code features (such as specified classes or methods), actions carried out by a particular thread, or a combination thereof. Executed code features, in a particular implementation, can be determined by monitoring a stack associated with executing the first code version, such as a call (e.g. execution) stack.

Changed code features can be determined in step 1026. Changed code features can be determined by comparing the first code version with one or more other code versions. In specific examples, the code versions to be compared with the first code version can be code versions created (or updated) within a threshold time period, code versions associated with a particular programmer or developer, code versions meeting other criteria, or combinations thereof. Although step 1026 is shown as occurring after steps 1010 and 1018, in other aspects, step 1026 can occur before, or concurrently with, step 1010 or step 1018. In addition, changed code features can be filtered in a manner similar to step 1022.

In a specific example, determining changed code features in step 1026 can include determining definition information for code features of the first code version and the comparison code versions in optional step 1030. Implementation information for the code features can be determined in optional step 1034. In optional step 1038, the definition information and/or implementation information of the code features can be compared to determine changed code features. In some cases, the method 1000 can include only one of steps 1030 and 1034. Or, one of steps 1030 and 1034 can be carried out, the information can be compared in step 1038, and, depending on the result of the comparison, the method 1000 can continue at step 1046, or the other of 1030 and 1034 can be followed by another comparison step 1038.

Code features, such as changed or executed code features, can be analyzed in process 1046. In a specific example, executed code features are analyzed in decision 1050 to determine whether a code feature is also a changed code feature. If the executed code feature is also a changed code feature, it can be marked as a potentially relevant code feature in step 1054. In other examples, a changed code feature can be analyzed to determine whether the code feature is also an executed code features. If the changed code feature is also an executed code feature, it can be marked as a potentially relevant code feature. In other examples, the analyzing may be carried out in a different manner.

After a code feature has been determined to not be both changed and executed in decision 1050, or marked as potentially relevant in step 1054, the method 1000 can determine in decision 1058 if there are any additional code features to be analyzed. If so, the method 1000 can return to process 1046. If no more code features are to be analyzed, the method can proceed to decision 1062.

In decision 1062, the method 1000 can determine if at least one code feature has been marked, such as in step 1054, as being potentially relevant to a code behavior of interest. If no such code features have been identified, the method 1000 can end at step 1066. If at least one potentially relevant code feature has been identified, the method can proceed to optional step 1070.

In step 1070, other potentially relevant code features can be identified. For example, for all or a portion of the code features marked as potentially relevant in step 1054, related code features can be identified. Related code features can include code features changed by the same developer or programmer, such as within a relevant time period. Related code features can also include logically/operationally related code features. For example, if a class method is marked as potentially relevant in step 1054, other methods of the class (which, in some examples, can be changed methods and/or executed methods) can be identified as potentially relevant in step 1070.

In optional step 1074, potentially relevant code features, such as code features marked in step 1054 or identified in step 1070, can be ranked accordingly to a likelihood they are related to the code behavior of interest. Ranking can account for one or more factors, including using a weighting scheme. Factors which can be used to rank code features include whether the code feature was marked in step 1054 or identified in step 1070. For example, code features marked in step 1054 may be more likely to be relevant to code behaviors of interest than code features identified in step 1070.

Code features can also be ranked based on the date they were last changed, the number of times they were executed, and in how close proximity the code feature was executed to when the behavior of interest was observed. For example, more recently changed code features may be more likely to be relevant than changes compared with older code versions. Code features that were executed more frequently (or, in some cases, less frequently) may be more likely to be relevant to the code behavior of interest. In at least some cases, code features that were executed more closely in time to when the behavior of interest occurred may be more relevant than code features that were executed less closely in time to when the behavior was observed.

Code features can be ranked using other criteria, or combinations of criterions, including accounting for the identity of a programmer or developer associated with the code feature. For example, some developers or programmers may be more or less likely to produce code features that generate errors, and the ranking can take this reputation into account.

In step 1078, a notification of potentially relevant code features can be provided. For example, the potentially relevant code features can be provided to a user. When step 1074 is carried out, the notification can include displaying the potentially relevant code features according to the ranking.

In optional step 1082, code associated with the potentially relevant code features can be provided. For example, by selecting a particular code feature, a user may be provided with the relevant source code corresponding to the code feature. When the code feature is a changed code feature, the code provided to a user can include an indication of changes to the code compared with one or more other code versions. The code can be reviewed to determine the source of the behavior of interest. The method can then end in step 1066.

Example 3—Computing Systems

Figure 11:
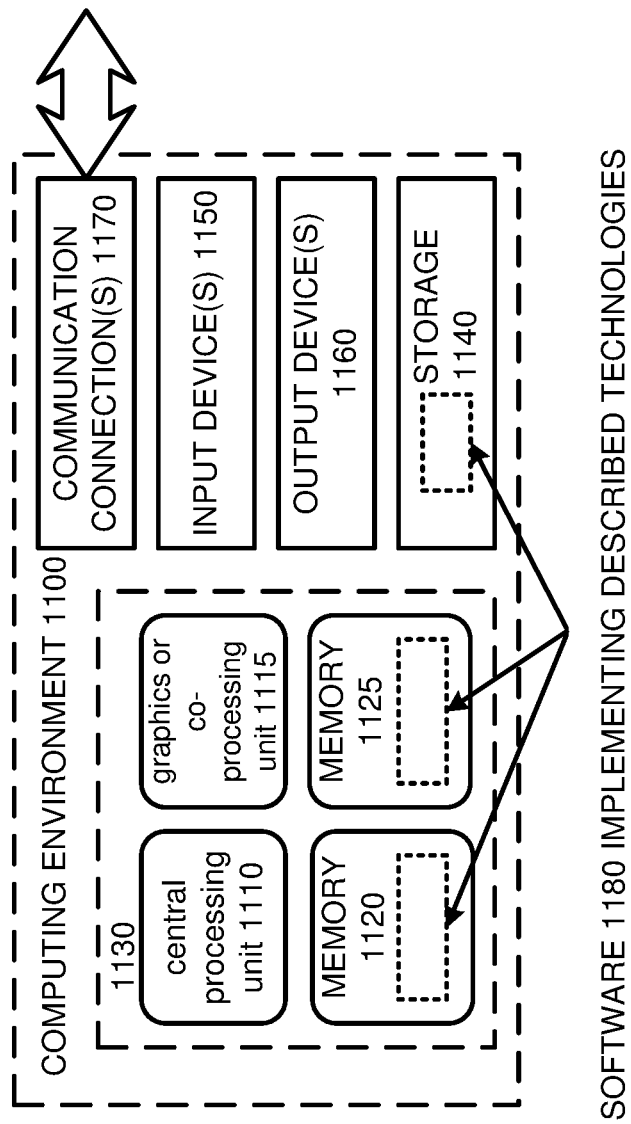
FIG. 11 is a diagram of an example computing system in which some described embodiments can be implemented.

FIG. 11 depicts a generalized example of a suitable computing system 1100 in which the described innovations may be implemented. The computing system 1100 is not intended to suggest any limitation as to scope of use or functionality of the present disclosure, as the innovations may be implemented in diverse general-purpose or special-purpose computing systems.

With reference to FIG. 11, the computing system 1100 includes one or more processing units 1110, 1115 and memory 1120, 1125. In FIG. 11, this basic configuration 1130 is included within a dashed line. The processing units 1110, 1115 execute computer-executable instructions, such as for implementing a behavior analysis engine, and associated methods, described in Examples 1 and 2. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s) 1110, 1115. The memory 1120, 1125 stores software 1180 implementing one or more innovations described herein, in the form of computer-executable instructions suitable for execution by the processing unit(s) 1110, 1115. The memory 1120, 1125, may also store database data, such as data associated with the database 208 of FIG. 2.

A computing system 1100 may have additional features. For example, the computing system 1100 includes storage 1140, one or more input devices 1150, one or more output devices 1160, and one or more communication connections 1170. An interconnection mechanism (not shown) such as a bus, controller, or network interconnects the components of the computing system 1100. Typically, operating system software (not shown) provides an operating environment for other software executing in the computing system 1100, and coordinates activities of the components of the computing system 1100.

The tangible storage 1140 may be removable or non-removable, and includes magnetic disks, magnetic tapes or cassettes, CD-ROMs, DVDs, or any other medium which can be used to store information in a non-transitory way and which can be accessed within the computing system 1100. The storage 1140 stores instructions for the software 1180 implementing one or more innovations described herein.

The input device(s) 1150 may be a touch input device such as a keyboard, mouse, pen, or trackball, a voice input device, a scanning device, or another device that provides input to the computing system 1100. The output device(s) 1160 may be a display, printer, speaker, CD-writer, or another device that provides output from the computing system 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 4—Cloud Computing Environment

Figure 12:
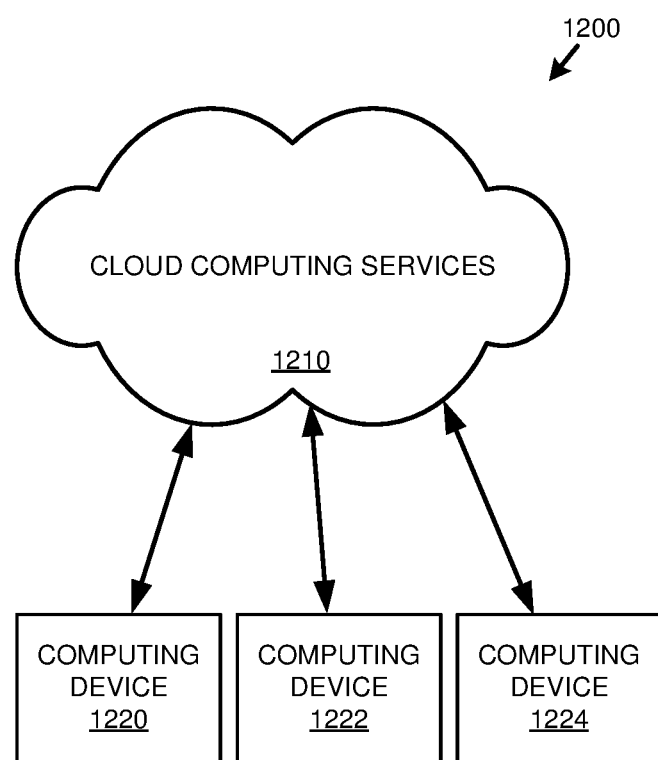
FIG. 12 is an example cloud computing environment that can be used in conjunction with the technologies described herein.

FIG. 12 depicts an example cloud computing environment 1200 in which the described technologies can be implemented. The cloud computing environment 1200 comprises cloud computing services 1210. The cloud computing services 1210 can comprise various types of cloud computing resources, such as computer servers, data storage repositories, networking resources, etc. The cloud computing services 1210 can be centrally located (e.g., provided by a data center of a business or organization) or distributed (e.g., provided by various computing resources located at different locations, such as different data centers and/or located in different cities or countries).

The cloud computing services 1210 are utilized by various types of computing devices (e.g., client computing devices), such as computing devices 1220, 1222, and 1224. For example, the computing devices (e.g., 1220, 1222, and 1224) can be computers (e.g., desktop or laptop computers), mobile devices (e.g., tablet computers or smart phones), or other types of computing devices. For example, the computing devices (e.g., 1220, 1222, and 1224) can utilize the cloud computing services 1210 to perform computing operators (e.g., data processing, data storage, and the like).

Example 5—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 11, computer-readable storage media include memory 1120 and 1125, and storage 1140. The term computer-readable storage media does not include signals and carrier waves. In addition, the term computer-readable storage media does not include communication connections (e.g., 1170).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system that implements a code analysis system, the computing system comprising:
  a memory;
  one or more processing units coupled to the memory; and
  one or more computer readable storage media storing instructions that, when loaded into the memory, cause the one or more processing units to perform operations for:
  receiving a first code version, the first code version comprising a first plurality of source code features;

receiving a second code version, the second code version comprising a second plurality of source code features;

executing an executable version of the first code version, which can be the first code version;

monitoring the execution of the executable version of the first code version, the monitoring comprising determining a third plurality of source code features from the first plurality of source code features which are executed during the execution of the executable version of the first code version, the determining comprising determining classes or methods executed, called, invoked, constructed, or instantiated during execution of the executable version of the first code version;

generating a first plurality of source code signatures for the first code version from one or more source code features of the first plurality of source code features defined in source code or byte code of the first code version:

wherein at least a first source code feature of the first plurality of source code features comprises (i) a declaration of a method, function, or class, the declaration comprising a first plurality of first source code elements or a first plurality of first byte code elements of the at least a first source code feature, the first plurality of first source code elements or the first plurality of first byte code elements being selected from the group consisting of access types, return types, method names, arguments numbers, and argument types; or (ii) a first plurality of operations, defined in source code or byte code of the at least a first source code feature, that implement a method or function; and wherein a first source code signature of the at least a first source code feature comprises (i) a concatenation of the first plurality of first source code elements or the first plurality of first byte code elements, or a concatenation of the first plurality of operations; or (ii) a hash value generated from a concatenation of the first plurality of first source code elements or the first plurality of first byte code elements, or a hash value generated from a concatenation of the first plurality of operations;

generating a second plurality of source code signatures for the second code version from one or more source code features of the second plurality of source code features defined in source code or byte code of the second code version:

wherein at least a second source code feature of the second plurality of source code features comprises (i) a declaration of a method, function, or class, the declaration comprising a second plurality of second source code elements or a second plurality of second byte code elements, the second plurality of second source code elements or the second plurality of second byte code elements being selected from the group consisting of access types, return types, method names, arguments numbers, and argument types; or (ii) a second plurality of operations, defined in the source code or byte code of the at least a second code feature, that implement a method or function; and wherein a second source code signature of the at least a second source code feature comprises (i) a concatenation of the second plurality of second source code elements or the second plurality of second byte code elements, or a concatenation of the second plurality of operations; or (ii) a hash value generated from a concatenation of the second plurality of second source code elements or the second plurality of second byte code elements, or a hash value generated from a concatenation of the second plurality of operations;

comparing the first plurality of source code signatures with the second plurality of source code signature;

in response to determining that a third source code signature for a given source code feature of the first code version differs from a fourth source code signature for a source code feature of the second code version corresponding to the given source code feature, adding the given source code feature to a fourth plurality of source code features;

comparing the third plurality of source code features and the fourth plurality of source code features, at least a portion of the compared third plurality of source code features not directly identified by the monitoring as associated with a runtime error, wherein source code features present in both the third plurality of source code features and the fourth plurality of source code features are added to a fifth plurality of source code features; and providing an indication that a source code feature of the fifth plurality of source code features is potentially associated with the code behavior of interest.

2. The computing system of claim 1, wherein determining the third plurality of source code features comprises analyzing a call stack associated with the execution of the executable version of the first code version.

3. The computing system of claim 1, the processing further comprising, for at least one source code feature indicated as potentially associated with the code behavior of interest:

comparing source code of the first code version associated with the at least one source code feature with source code of the second code version associated with the at least one source code feature;

displaying the first source code version with an indication of changes compared with the second source code version.

4. The computing system of claim 1, wherein a sixth plurality of source code features of the fifth plurality of source code features are indicated as potentially associated with the code behavior of interest, and the processing further comprises:

ranking source code features of the sixth plurality of source code features;

wherein the ranking is based at least in part on identities of individuals associated with changes to the sixth plurality of source code features.

5. The computing system of claim 1, wherein a sixth plurality of source code features of the fifth plurality of source code features are indicated as potentially associated with the code behavior of interest, and the processing further comprises:

ranking source code features of the sixth plurality of source code features;

wherein the sixth plurality of source code features comprise methods of one or more classes and the ranking is based at least in part on identities of the one or more classes.

6. The computing system of claim 1, wherein a sixth plurality of source code features of the fifth plurality of source code features are indicated as potentially associate with the code behavior of interest, and the processing further comprising:

ranking source code features of the sixth plurality of source code features;
wherein the sixth plurality of source code features comprise methods of one or more classes and the ranking is based at least in part on a number of changed methods associated with the one or more classes.

7. The computing system of claim 1, wherein the determining of the third plurality of source code features or the fourth plurality of source code features comprises applying at least one filter criterion, the at least one filter criterion comprising at least one class identifier.

8. The computing system of claim 1, wherein determining the third plurality of source code features comprises applying at least one filter criterion, the at least one filter criterion comprising at least one execution identifier.

9. The computing system of claim 1, wherein executing the first code version comprises:
executing a plurality of stored commands.

10. The computing system of claim 1, wherein determining a fourth plurality of code features comprises determining added source code features, deleted source code features, and modified source code features between source code or byte code of the first code version and source code or byte code of the second code version.

11. The computing system of claim 1, wherein the code behavior of interest comprises a runtime error.

12. One or more computer-readable storage media storing computer-executable instructions for causing a computing system to perform processing to identify at least one code feature potentially associated with a code behavior of interest, the processing comprising:
displaying on a graphical user interface a user interface control allowing a user to select a user-selected timeframe during which changed code may be associated with a code behavior of interest, the user interface control being useable to define a start date and an end date for the user-selected timeframe;
through the user interface control, receiving user input selecting the user-selected timeframe;
receiving a first code version of computer code, the first code version defined by source code comprising a first plurality of source code features;
executing an executable version of the first code version, which can be the first code version;
monitoring the execution of the executable version of the first code version, the monitoring comprising determining a second plurality of source code features executed during the execution of the executable version of the first code version, the determining comprising determining classes or methods defined in the source code of the first code version and executed, called, invoked, constructed, or instantiated during execution of the executable version of the first code version;
analyzing a priority of stored code versions of the computer code to determine one or more second code versions of the computer code created or modified within the user-selected timeframe by determining whether a created-on or modified-on date associated with a stored code version is within the user-selected timeframe;
for the one or more second code versions, determining a third plurality of source code features differing between the first code version and the one or more second code version by one or both of:
(i) comparing source code signatures, a source code signature being associated with one or more source code features, wherein a given source code signature is generated from one or more source code elements or byte code elements of the one or more source code features, for one or more source code features of the first code version and a given second code version, wherein if source code signatures for an associated source code feature of the one or more source code features differ between the first code version and the given second code version, and a date of the given second code version is within the user-selected timeframe, the one or more source code features are added to the third plurality of source code features; or
(ii) comparing source code or byte code text between one or more source code features of source code or byte code for the first code version and source code or byte code of a given second code version of the one or more second code versions, wherein if a source code text or a byte code text differs between the first code version and the given second code version, and a date of the given second code version is within the user-selected timeframe, code features defined by the changed source code text or byte code text are added to the third plurality of source code features;
comparing, the second plurality of source code features and the third plurality of source code features, at least a portion of the compared third plurality of third source code features not directly identified by the monitoring as associated with a runtime error, wherein source code features present in both the second plurality of source code features and the third plurality of source code features are added to a fourth plurality of code features; and
providing an indication that a source code feature of the fourth plurality of source code features is potentially relevant to the code behavior of interest.

13. In a computing system comprising a memory and one or more processors, a method of determining methods potentially associated with a code error, the method comprising:
receiving a first code version, the first code version comprising a first plurality of source code features;
receiving a second code version, the second code version comprising a second plurality of source code features;
executing an executable version of the first code version, which can be the first code version;
monitoring the execution of the executable version of the first code version, the monitoring comprising determining a third plurality of source code features from the first plurality of source code features which are executed during the execution of the executable version of the first code version, the determining comprising determining classes or methods executed, called, invoked, constructed, or instantiated during execution of the executable version of the first code version;
generating a first plurality of source code signatures for the first code version from one or more source code features of the first plurality of source code features defined in source code or byte code of the first code version:
wherein at least a first source code feature of the first plurality of source code features comprises (i) a declaration of a method, function, or class, the declaration comprising a first plurality of first source code elements or a first plurality of first byte code elements of the at least a first source code feature, the first plurality of first source code elements or the first plurality of first byte code elements being selected from the group consisting of access types, return types, method names, arguments numbers, and argument types; or (ii) a first plurality of operations, defined in source code or byte code of the at least a first source code feature, that implement a method or function; and wherein a first source code signature of the at least a first source code feature comprises (i) a concatenation of the first plurality of first source code elements or the first plurality of first byte code elements, or a concatenation of the first plurality of operations; or (ii) a hash value generated from a concatenation of the first plurality of first source code elements or the first plurality of first byte code elements, or a hash value generated from a concatenation of the first plurality of operations;

generating a second plurality of source code signatures for the second code version from one or more source code features of the second plurality of source code features defined in source code or byte code of the second code version:

wherein at least a second source code feature of the second plurality of source code features comprises (i) a declaration of a method, function, or class, the declaration comprising a second plurality of second source code elements or a second plurality of second byte code elements, the second plurality of second source code elements or the second plurality of second byte code elements being selected from the group consisting of access types, return types, method names, arguments numbers, and argument types; or (ii) a second plurality of operations, defined in the source code or byte code of the at least a second code feature, that implement a method or function; and wherein a second source code signature of the at least a second source code feature comprises (i) a concatenation of the second plurality of second source code elements or the second plurality of second byte code elements, or a concatenation of the second plurality of operations; or (ii) a hash value generated from a concatenation of the second plurality of second source code elements or the second plurality of second byte code elements, or a hash value generated from a concatenation of the second plurality of operations;

comparing the first plurality of source code signatures with the second plurality of source code signature;

in response to determining that a third source code signature for a given source code feature of the first code version differs from a fourth source code signature for a source code feature of the second code version corresponding to the given source code feature, adding the given source code feature to a fourth plurality of source code features;

comparing the third plurality of source code features and the fourth plurality of source code features, at least a portion of the compared third plurality of source code features not directly identified by the monitoring as associated with a runtime error, wherein source code features present in both the third plurality of source code features and the fourth plurality of source code features are added to a fifth plurality of source code features; and providing an indication that a source code feature of the fifth plurality of source code features is potentially associated with the code behavior of interest.

14. The method of claim 13, further comprising:

displaying on a graphical user interface a user interface control allowing a user to view query language statements generated during the executing the executable version of the first code version; and receiving user input activating the user interface control; and displaying content of at least one query language statement of the query language statements in response to the receiving user input.

15. The method of claim 14, wherein the displaying on the graphical user interface the user interface control and the receiving user input are carried out during the executing the executable version of the first code version.

* * * * *